A. N. BENN.
PICKLING, CURING, TREATING, AND HANDLING MEAT FOOD PRODUCTS.
APPLICATION FILED JUNE 21, 1916.
1,221,957.
Patented Apr. 10, 1917.
2 SHEETS—SHEET 1.
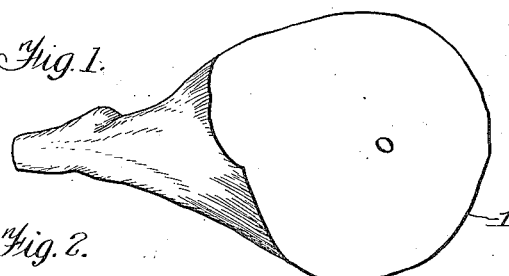
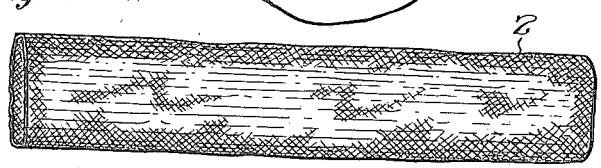
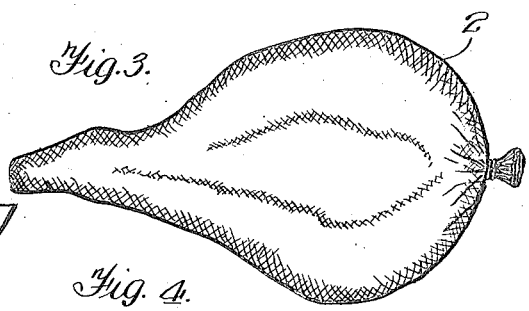
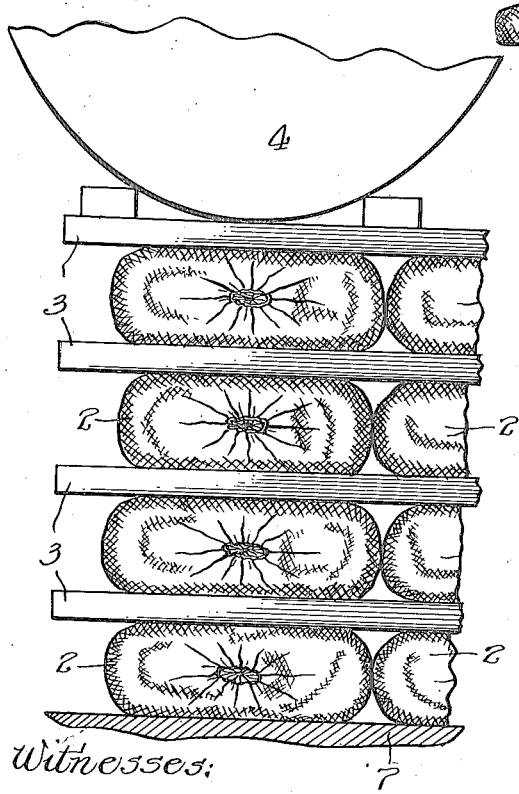
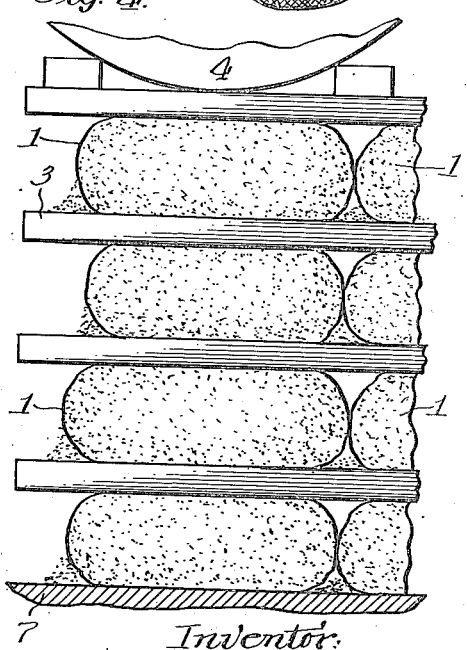
Witnesses:
A. Akerholm
A. J. Sauser
Inventor:
Alonzo Newton Benn
by William E. Williams
Attorney

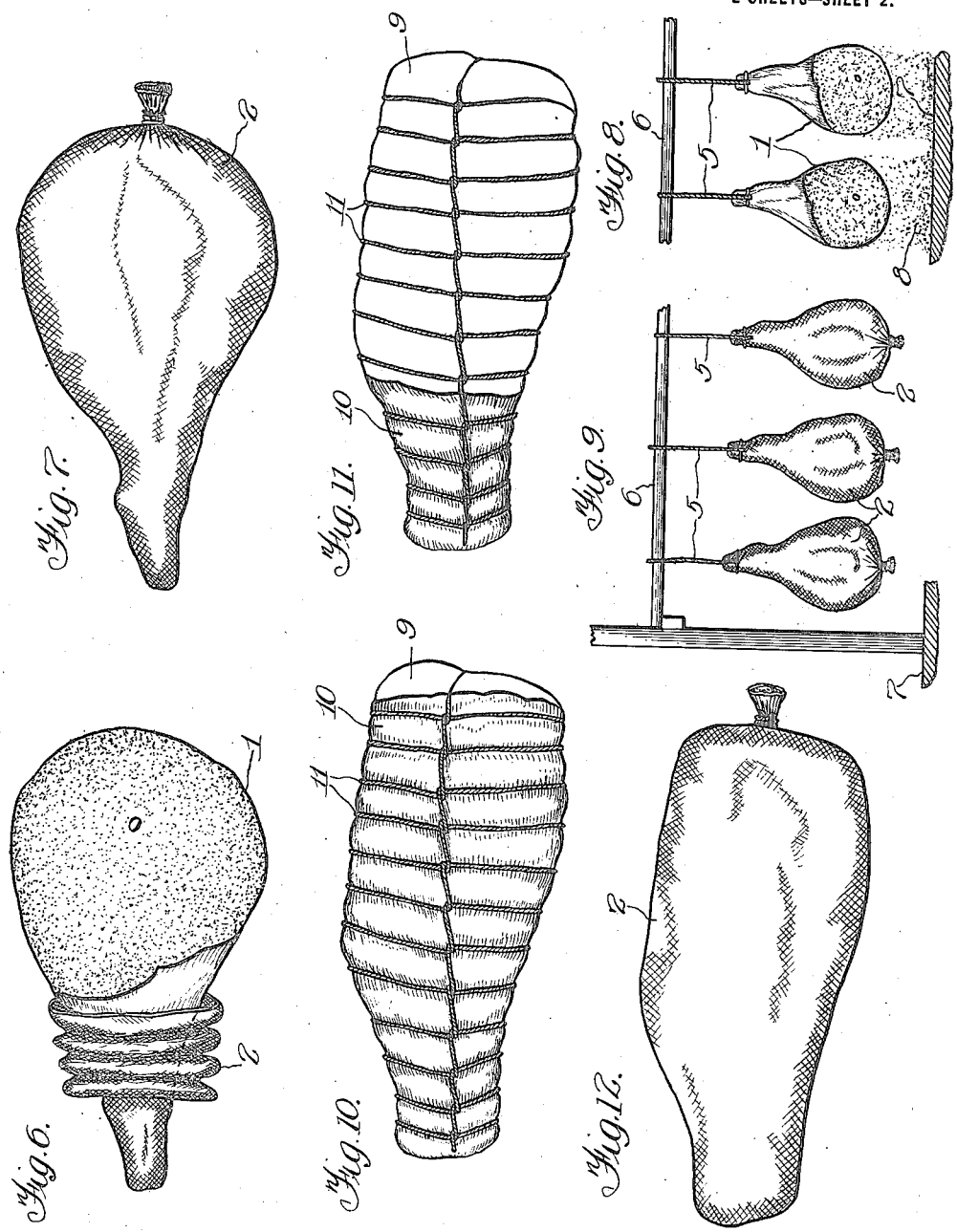

UNITED STATES PATENT OFFICE.

ALONZO NEWTON BENN, OF CHICAGO, ILLINOIS.

PICKLING, CURING, TREATING, AND HANDLING MEAT FOOD PRODUCTS.

1,221,957.  Specification of Letters Patent.  Patented Apr. 10, 1917.

Application filed June 21, 1916. Serial No. 104,996.

*To all whom it may concern:*

Be it known that I, ALONZO N. BENN, a citizen of the United States, residing at Chicago, in the county of Cook and the State of Illinois, have invented a new and useful Improvement in Processes of Pickling, Curing, Treating, and Handling Meat Food Products, of which the following is a specification.

In different countries and in different sections of the same country, the methods of preparing meat food products vary widely and the wishes of the people must be catered to even in the small details in order to properly secure the market. The tastes and preferences of different countries and of large sections of the same country result in the consumption of such volume of product having special features that the meat packer is justified in being at considerable trouble and expense in preparing and handling his output in a manner to get the cheapest possible production and the finest and best products with the least loss of waste or damage.

My invention especially relates to pork hams, shoulders, picnics and loin rolls and beef hams.

In the United States what are known as American short cut hams are generally preferred. England generally prefers what are known as long cut hams.

Italy prefers hams of a widely different cut, trim and method of curing, treating and drying and a part of my process relates to the Italian style hams hereinafter referred to as Italian hams.

My invention also relates to quite a wide application of the pickling, curing, treating and handling of meat food products and this application taken in conjunction with my other pending application, Serial No. 61,556, filed November 15, 1915, for processes of pickling and curing hams and other meats, meet the requirements necessary to produce the greatest saving and the finest products in this line of which I am aware.

The invention is set forth in the claims.

Reference will be had to the accompanying drawings in which:

Figure 1 is a plan of a ham cut and trimmed to meet the Italian demand.

Fig. 2 is a view of a stockinet before it is applied to a ham.

Fig. 3 shows the ham in Fig. 1 secured within the stockinet shown in Fig. 2.

Fig. 4 shows a pile of Italian hams undergoing a part of the treatment in curing by the old method.

Fig. 5 shows the corresponding treatment in curing by my method.

Fig. 6 shows a later stage of the work on Italian hams from that shown in Fig. 5.

Fig. 7 shows the next step from Fig. 6.

Fig. 8 shows a form in the old way of working on Italian hams at a later stage from that of Fig. 4.

Fig. 9 is a view of my process corresponding to the stage of the work shown in Fig. 8.

Fig. 10 is known as a boned rolled and tied ham.

Fig. 11 is known as a boned rolled and tied skinned ham.

Fig. 12 shows the ham shown in Figs. 10 and 11 inclosed in a stockinet in accordance with my process.

I will first describe my process in connection with Italian hams. The fresh ham prepared for the Italian style is cut with a longer shank and with a longer body at the butt end and it has the aitch bone removed and generally a lean ham is preferred for this style as is shown by Fig. 1.

Italian hams after being properly cut and trimmed as mentioned, are first cured in what is generally known as dry salt, the salt being applied to the outside of the hams in the requisite quantity and the hams are then placed on the floor of the curing room in parallel layers forming piles 12 to 16 feet long or a single board length and of convenient width, a board lying between each layer as is shown by Fig. 4 wherein 1 indicates the hams and 3 the boards. The piles are made up 8 to 12 rows of hams high and then heavy weights are placed upon the top boards, which weights are usually barrels, casks or tierces filled with packing house products which are in storage and which are indicated in the drawings by 4. It is the intention to put sufficient weight upon the hams during this curing in dry salt to flatten them out materially and at the same time to compress and harden the tissues of the meat.

With my process I inclose the ham 1 in the stockinet 2 after the dry salt has been applied, the stockinet holding the requisite quantity of the salt on the ham in the place where it is most needed, whereas in the absence of the stockinet in the old treatment as shown by Fig. 4, in handling the hams and putting them in piles, some of the salt becomes dislodged and is wasted and consequently more salt is required to obtain the desired results than with my process as is shown by Fig. 5 wherein all of the salt is held to the hams by the stockinet.

In Fig. 4 by the old method much of the salt falls off from the vertical edges of the hams and air currents and air moisture on the exposed surfaces of the hams result in diminishing the action of the salt, but with my process the stockinet prevents this and at the same time preserves and protects the hams from dirt, uneven exposure and uneven drying of the meat during this curing and the natural color of the meat is retained, whereas with the old method wide variations in the appearance, quality and curing result from the uneven exposure of the different portions of the hams.

After the hams have remained a sufficient length of time in the dry salt curing in piles as indicated, they are taken up and immersed in soaking vats of water and the extraneous adhering salt is dissolved and soaked off of the hams.

In the old method the lower edges and corners of the hams are more affected by the salt than are the upper exposed edges and corners and in this soaking operation the soaking which is necessary for the lower or more salty regions of the hams is more than is needed for the other regions not so strongly affected by the salt, but with my process the stockinet holds the salt in a manner that a more uniform curing is produced.

By the old method as shown in Fig. 4 in the dry salt curing, spots on the hams which do not receive or retain the right amount of salt, occasioned by careless or accidental displacement of the salt, become damaged, which is usually described as "slimy." Such damage is practically prevented by the use of my process as indicated.

After the hams come out of the soaking vat in the Italian process and after the surplus salt has been removed, the hams are then washed, which washing is made necessary by exposure during the dry salt curing to the open air, the floor of the room, pressing boards, trucks and soaking vats and in the handling, etc., and while still damp from the washing they are laid upon tables and ground black pepper is rubbed over the meat surface forming sort of a pasty coating of pepper and the hams are then hung up to undergo the action of the pepper as is indicated by Fig. 8 which shows the old method.

5 indicates the hanging devices, 6 the supporting rail and 7 the floor of the room. In this work and during the time the pepper is acting on the hams, much of the pepper falls off and drops on the floor as is indicated by the specks 8 in Fig. 8 and is a considerable loss or expense, besides at times leaving less than the required quantity of pepper adhering to the meat to give it the desired pepper flavor.

With my process the hams inclosed in the stockinets when they come from the soaking vats are not required to be washed, the stockinets having protected the hams from dirt, the floor, the boards, trucks, etc. The stockinet is then opened as is indicated by Fig. 6 and the pepper is applied to the meat surface of the ham and the stockinet is then again secured over the ham as is shown by Fig. 7 and the hams are hung up as is shown by Fig. 9 to undergo the pepper treatment.

With my process the stockinet holds the pepper in the desired quantity in the right place all of the time and a large saving in pepper is brought about and a more uniform action of the pepper is obtained upon the meat. With the old method air currents and different directions of temperature from light or heat seriously affect the different spots on the hams, which is not the case to the same extent with my process.

In the old method after the hams have received the requisite action of the pepper, they are then wrapped in paper to hold the pepper on and otherwise protect the ham while being handled and marketed. With my process the stockinet performs this service and the hams are taken from their hangings in Fig. 9 and are ready for market without further wrapping, the stockinet remaining on and furnishing all the protection needed. This is an additional safeguard as there is no chance of any loss of pepper as might be occasioned in the handling and wrapping according to the old method and if by any accident the ham is not allowed to remain hanging long enough my stockinet keeps the pepper in position to act until the actual consumption of the ham takes place.

With the old method the removal of the aitch bone leaves some loose flabby edges in the meat, thus causing a somewhat ragged appearance, which portion of the ham sometimes becomes too dry and hard and badly cracked. With my process the stockinets hold these portions tightly together and cause the hams to retain a better and brighter color, keeping out the dirt and materially increasing the appetizing appearance of the product. The stockinets should remain on the hams until they are ready to be sliced or otherwise disposed of.

Italian hams must be lean and at times it is impossible to secure a sufficient supply of lean hams for this purpose.

My invention will permit the making of a new article which I call Italian skinned hams. I take the ordinary Italian cut hams, remove the skin and surplus fat from the body of the hams and then inclose them in stockinets and treat them as before described. The skin portion of an Italian ham is not used even in case of lean hams and I make a better product by skinning the lean hams as well as those from which I remove the surplus fat and then inclose them in stockinets, which aids in the curing and treatment in the manner before described. A larger area of the meat surface, when the hams are skinned, is exposed to the curing treatment, thus producing a more uniform flavor, besides the skin removed from green or fresh hams is valuable for leather purposes.

The removal of the skin and surplus fat permits of almost a uniform thickness of fat to remain on all hams, thus making the Italian skinned hams much more uniform and very desirable.

The removal of the skin and surplus fat shortens the time of curing and treatment, thus saving in the cost and improving the quality of the product and this is secured only by the use of my process.

My invention permits the making of Italian boned rolled and tied hams, see Fig. 10, which shows such a ham ready for the stockinet and wherein 9 indicates the meat, 10 the skin and 11 the cord which ties the ham. In this case the bones have been removed, the skin has been lifted and the surplus fat has been removed, the skin returned and the ham then tied to shape by the cord 11. The ham thus prepared is inclosed in the stockinet as is indicated by the Fig. 12 and it is then treated as before described. Hams which have been boned rolled and tied green or fresh and then cured in pickle, lose the albumin (the albumins are soluble in water) binding qualities to such an extent that the hams when cooked do not bind or hold together as well as they should where the bones have been removed when the cooked hams are sliced for sale over the counter or to be eaten. With my process by inclosing boned rolled and tied hams in stockinets and curing them in dry salt under pressure or otherwise, the binding qualities will be better preserved and the cooked hams will be correspondingly improved and made more desirable.

I make Italian boned rolled and tied skinned hams as is indicated by Fig. 11, wherein 9 is the meat, 10 the skin and 11 the cord as before described for Fig. 10 and this ham likewise is inclosed in a stockinet as indicated by Fig. 12 and treated in the manner before described. A larger area of meat surface of the skinned ham being exposed to the curing treatment aids materially in lessening the cost and improving the quality of the product in the manner before described.

My invention has a wider application than for Italian hams alone. I use it for ordinary pork hams, skinned hams, boned rolled and tied hams, shoulders, picnics, loin rolls, beef hams and other food products and some of these uses of my process I will now describe.

In using the process on the meats last above described for pickling I inclose the meats in stockinets and draw the stockinets tightly around the meats, thus drawing together to the desired form the loose or exposed portions and then put the meats in pickle while inclosed in stockinets and the pickling operation is finished while the meats are embraced in the stockinets. On removal from the pickle, and on further handling and shipping the stockinets remain on the meats. During the pickling the stockinets hold the meats in shape and protect same from scum, specks and dirt, etc. In the handling and shipping the stockinets still hold the meats in shape and protect same from the injury which comes from contact with the hands of the men, trucks and other chances of contamination and saves the necessity of washing, scraping and trimming the product for further use or sale.

In using my process with the dry salt curing of this last class of meats, I first apply salt to the meat surface before applying the stockinet and then apply the stockinet, which not only holds the meat in shape as above described but also holds the salt in place on the meat, securing the benefits which I have mentioned in this part of the process for the Italian hams. With the dry salt cure alone the stockinet remains on the ham for further handling and shipping and is not removed until the meat is used and thus the stockinet not only affords the protection from dirt and injury as hereinbefore described in the curing treatment, handling and shipment but it also retains curing salt in greater quantity to the meat in the handling and shipping than is the case without it and thus insures more safety in curing, for in some cases the meat is sometimes exposed to unusual conditions tending to spoil the meat and which might spoil the meat in the absence of my process.

I use my process with hams which have had the skin lifted and the surplus fat removed before the curing and treatment and in thus using it the ham is skinned, the surplus fat removed and the stockinet is applied and the ham is cured, treated, handled and shipped, the stockinet remaining in place securing the benefits before described. The fat thus saved is of higher value than the fat that is removed from the meat after it has been cured and treated and besides a further big saving is effected in the expense of unnecessarily curing the surplus fat amounting to from fifteen to twenty-five per cent. of the original weight of the hams.

I use my process with hams which have had the skin lifted and the surplus fat removed and the skin replaced after the hams have been cured, by inclosing them in stockinets and handling or shipping the hams with the stockinets embracing them, the stockinets holding the loose skin in place during the handling or shipping to the end that on final marketing the product will be in much better shape and condition and will command a higher price than similar hams shipped without being inclosed in stockinets to afford this very necessary protection to the loose skin and in turn the additional protection the loose skin will give to the ham when held in place by the stockinets.

What I claim is:

1. A process for curing and treating meats which consists in applying curing materials to the meat, inclosing the meat in a stockinet, thus binding the material in place, then applying pressure on the meat to change its form and maintaining the pressure during the curing, then removing the surplus curing materials, then opening the stockinet and applying a secondary curing or treating material, then closing the stockinet and binding the material to the meat, then retaining the meat for a time for action on the part of the curing or treating material while the stockinet is in place and then handling and shipping the meat while still inclosed in the stockinet.

2. A process of curing and treating meats which consists first in applying curing material to the meat, then inclosing the meat and material in a stockinet, then applying pressure to the meat, then removing the surplus material by dissolving the same in a soaking vat while the stockinet is in place, then opening the stockinet and adding additional curing or treating material and then closing the stockinet and thus holding the material in contact with the meat by means of the stockinet for a sufficient length of time for the added material to act on the meat.

3. A process of curing meats which consists in applying curing material to the fresh meat and then inclosing the meat and curing material in a stockinet and retaining the same therein until the meat is sufficiently cured to smoke and to cook without smoking.

4. A process of curing meats which consits in applying curing material to the fresh meat and then inclosing the meat and curing material in a stockinet and retaining the same therein until the meat is sufficiently cured to smoke and to cook without smoking and shipping the meat while so contained in the stockinet.

5. A process of treating and curing meats which consists in applying curing or treating material to the meats and then inclosing both in a stockinet and holding the same therein while the material acts on the meat and then removing the surplus material by solution in a soaking vat while the stockinet is in place and then handling and shipping the same without removing the stockinet.

6. A process of treating and curing meats which consists in applying curing or treating material to the meat and then inclosing both in a stockinet for a period of time sufficient for the material to act on the meat and then removing the surplus material without removing the stockinet.

7. A process of treating and curing meats which consists in applying curing or treating material to the meat and inclosing both within a stockinet and then applying pressure to the meat and material while thus inclosed within the stockinet.

8. A process of treating and curing meats which consists in applying curing or treating material to the meat then inclosing both within a stockinet, then retaining the meats within the stockinet for the curing or treating period, then handling or shipping same without removing the stockinet.

9. A process of curing meats which consists in applying a stockinet to the fresh meat, then submitting the meat to the action of the curing pickle while held within the stockinet and then handling and shipping the pickled meat without removing the stockinet.

10. A process of treating meats which consists in lifting the skin, removing the surplus fat, replacing the skin and then inclosing the meat within a stockinet and thereby binding and holding the loose skin in place and otherwise protecting the ham for handling and shipping.

11. A process of curing, treating and handling meats which consists in lifting the skin and removing the surplus fat and removing the bones, then wrapping and tying the meat, then inclosing the same within a stockinet for handling and shipping.

12. A process of curing, treating and handling meats which consists in lifting the skin and removing the surplus fat and removing the bones, then wrapping and tying the meat, then inclosing the same within a stockinet, then curing and treating the same while inclosed within the stockinet.

13. A process of curing, treating and handling meats which consists in removing the skin or the greater portion thereof and inclosing the meat within a stockinet for handling and shipping.

14. A process of curing, treating and handling meats which consists in removing the skin or the greater portion thereof and the bones, wrapping and tying the meat and then inclosing the meat within a stockinet for handling and shipping.

15. A process of curing, treating and handling meats which consists in removing the skin or the greater portion thereof and surplus fat and the bones, wrapping and tying the meat and then inclosing the same within a stockinet and then curing and handling the meat for shipping same without removing the stockinet.

16. A process of curing, treating and handling meats which consists in properly curing the meat, then applying a flavoring or an additional curing material, then inclosing the meat and material in a stockinet and retaining the same within the stockinet while the added material acts on the meat.

17. A process of curing meats which consists in applying curing material to the fresh meat and then inclosing the meat and curing material in a close fitting elastic covering of porous material and retaining the same therein until the meat is sufficiently cured to smoke and to cook without smoking.

Signed in Chicago, in the State of Illinois and the county of Cook this 19" day of June, 1916.

ALONZO NEWTON BENN.

Witnesses:
A. AKERHOLM,
C. E. SHEA.